Oct. 12, 1926.
N. H. KNOWLTON
1,602,618
ASSEMBLING MACHINE
Filed Oct. 17, 1921    5 Sheets-Sheet 5
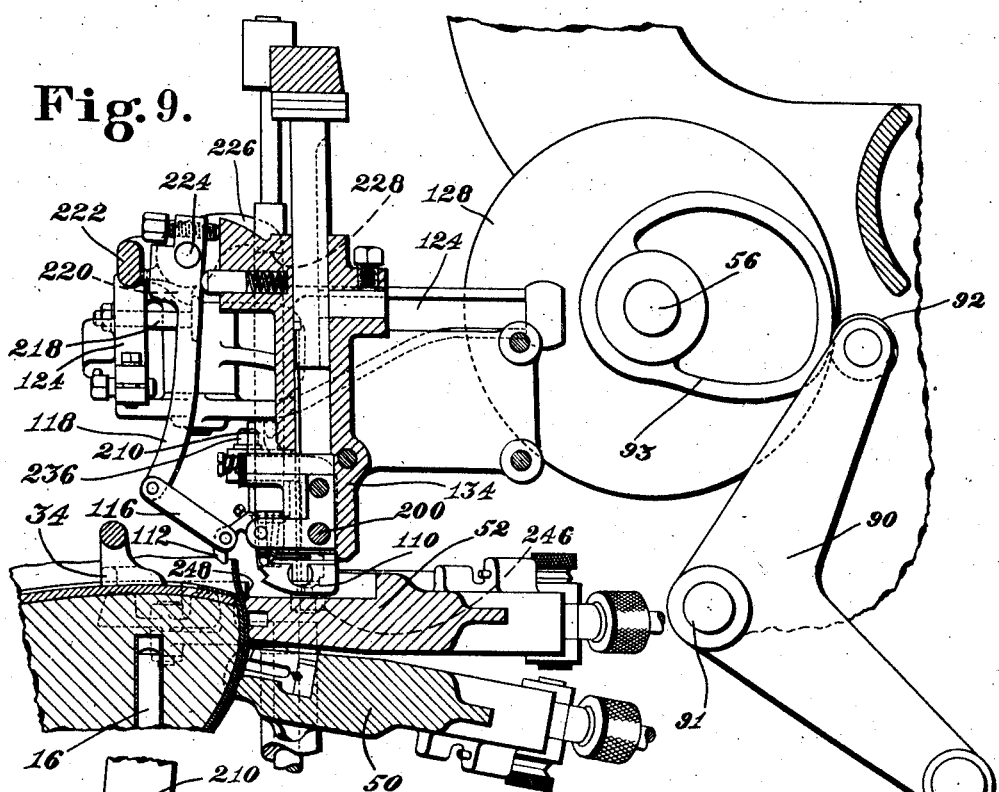
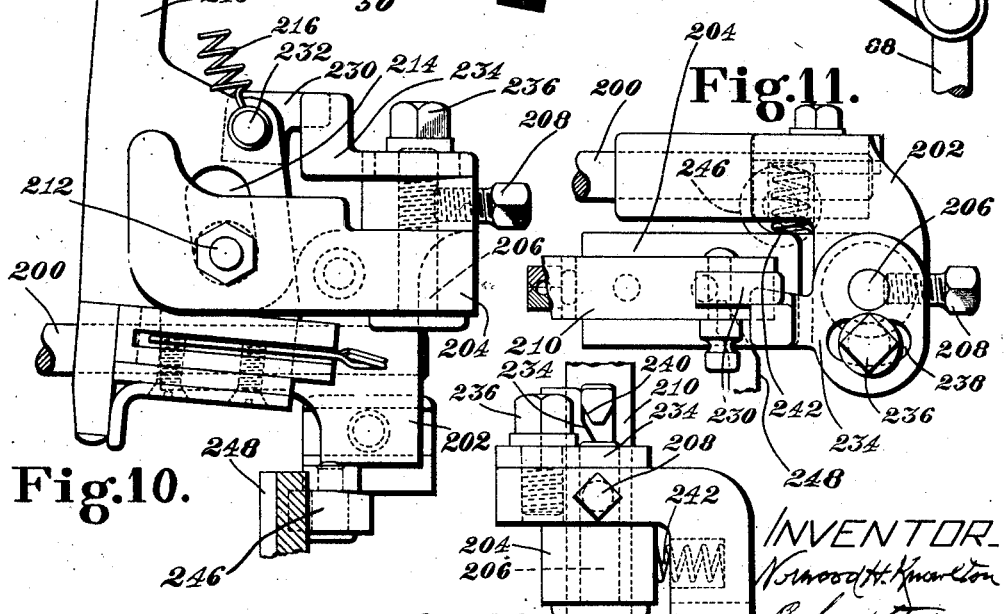

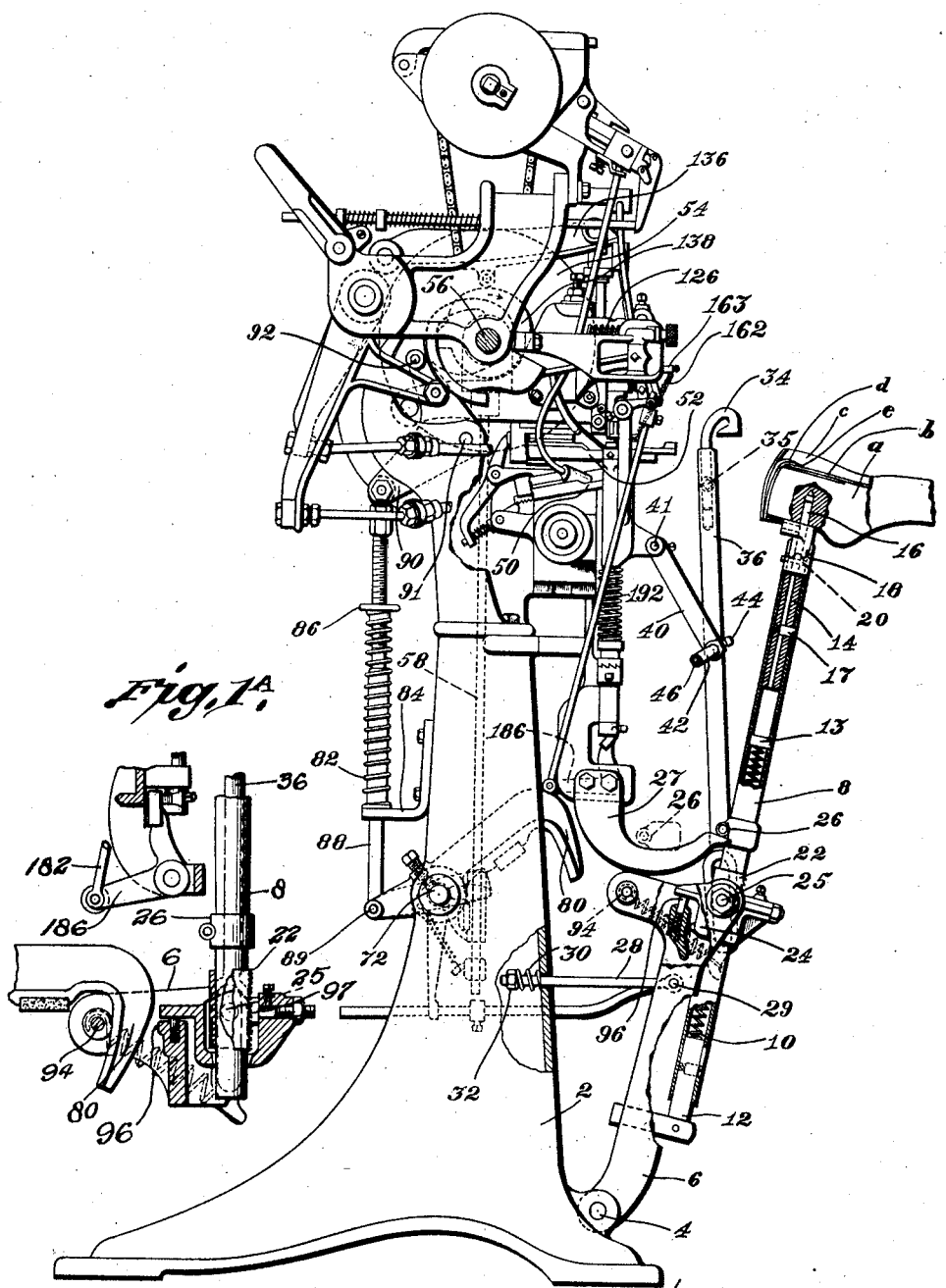

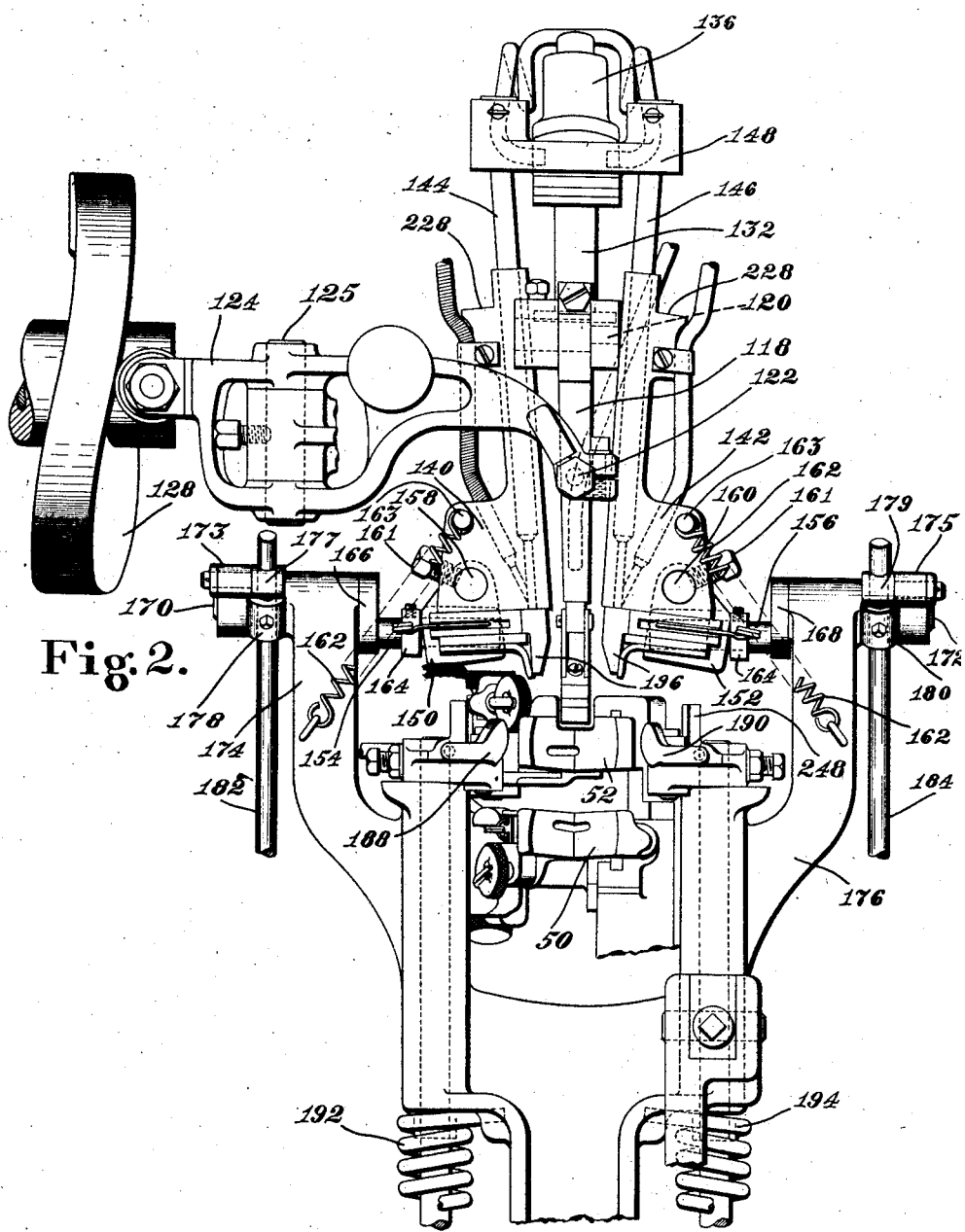

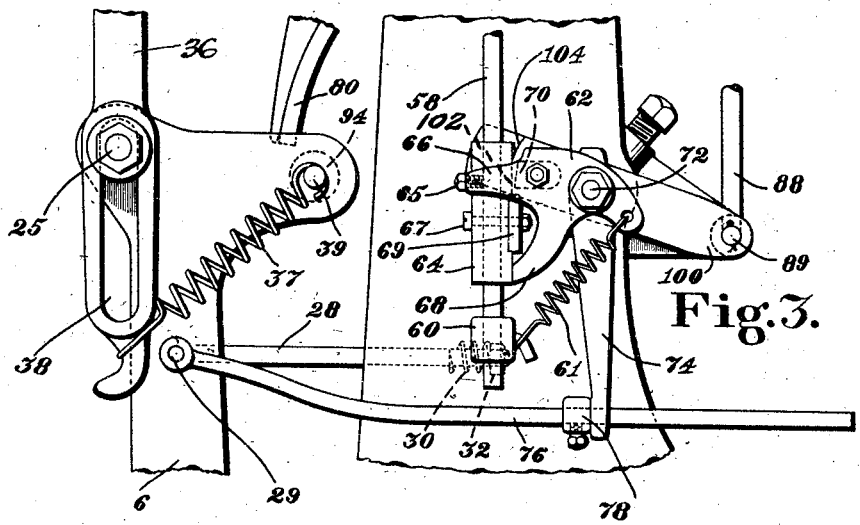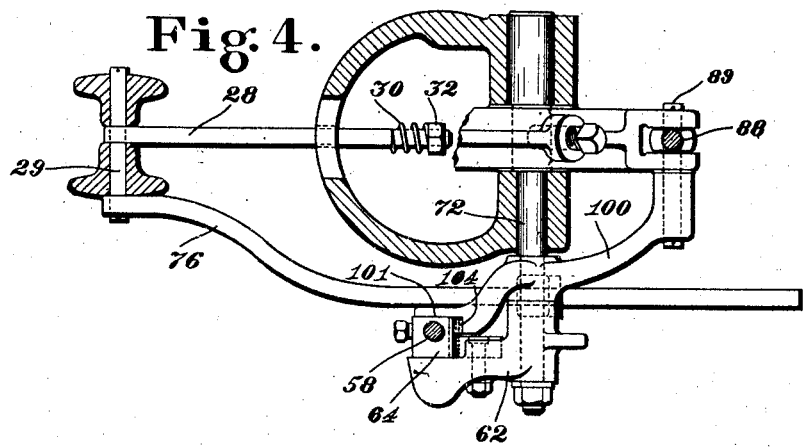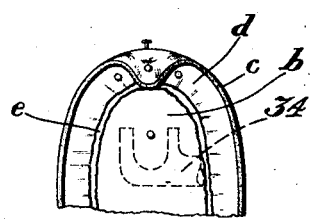

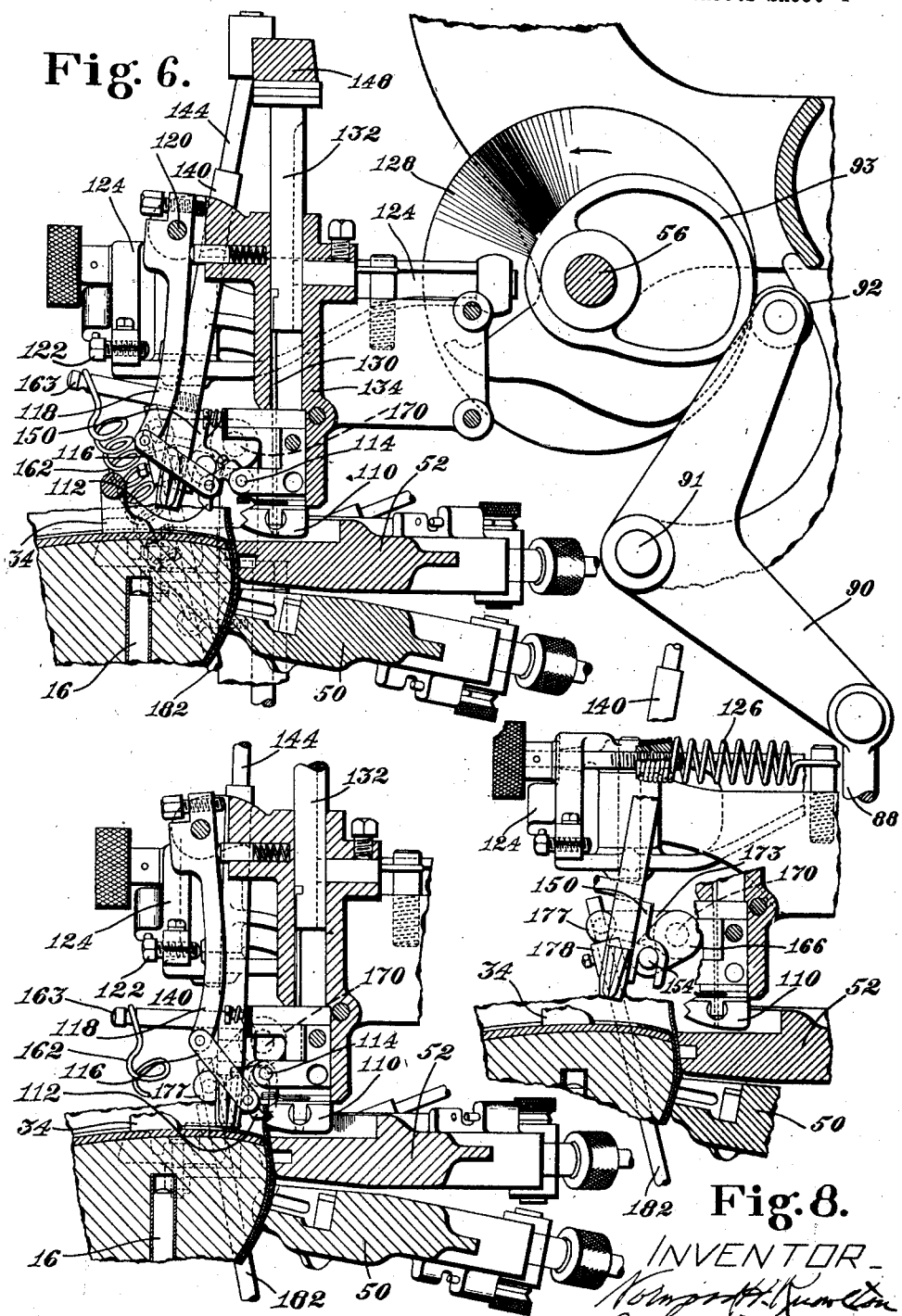

Patented Oct. 12, 1926.

1,602,618

UNITED STATES PATENT OFFICE.

NORWOOD H. KNOWLTON, OF ROCKPORT, MASSACHUSETTS, ASSIGNOR TO UNITED SHOE MACHINERY CORPORATION, OF PATERSON, NEW JERSEY, A CORPORATION OF NEW JERSEY.

ASSEMBLING MACHINE.

Application filed October 17, 1921. Serial No. 508,300.

This invention relates to machines for use in assembling parts of boots and shoes on their lasts. For the purpose of illustration an embodiment of the invention is herein shown as applied to a machine of the type disclosed in United States Letters Patent No. 1,356,510 granted October 26, 1920, on application of Hannah Ashton, executrix of the will of Orrell Ashton; in United States Letters Patent No. 1,443,288, granted January 23, 1923, on application of William Stewart; and in United States Letters Patent No. 1,541,823, granted June 16, 1925, on my application.

It is to be understood, however, that the invention is not restricted to embodiment in a machine of this particular type, certain features of the invention being of more general application to machines for operating upon boots and shoes.

General objects of the invention are to improve and perfect machines of this type without sacrifice of the utility of such machines as previously organized and to provide a machine which will be completely automatic in its action.

In assembling the parts of a boot or shoe upper upon its last the upper is placed over a last and a heel stiffener or counter, which is usually molded with an inturned flange, is placed between the lining and upper and these parts are properly positioned on the last vertically and laterally while the last is on the work support or last pin of the assembling machine. The shoe is then presented to the machine which acts to hold the upper in assembled relation to the last, to wipe over the upstanding margin of the upper at the end of the heel-seat upon the innersole and to secure the upper and flange of the counter at that point to the innersole by a tack which may be referred to as the central heel-seat tack. In the machines of the prior patents above referred to, mechanism is provided for driving tacks called herein counter tacks through the flange of the counter and into the heel-seat end of the innersole, these tacks securing the counter-flange and lining only, leaving the upper free. It has been customary to insert the counter tacks at the sides or adjacent to the corners of the heel-seat and the prior machines have been organized with this object in view. Under some conditions, however, it is desirable to insert the counter tacks rearwardly of the corners of the heel-seat and quite close to the central heel-seat tack, since, when the counter tacks are thus located, the counter is held firmly in proper relation to the last while the lining from points at the rear of the corners on each side to the counter wing is free to be drawn up and all wrinkles removed prior to being secured by the heel-seat lasting tacks. This is particularly advantageous in lasting Oxford shoes having a leather lining which requires considerable stretching to insure a proper fit of the lining about the heel end of the last. When the counter tacks are located close to the central heel-seat tack the possibility that the lining may be improperly secured, as sometimes happens in prior machines, thus necessitating the removal of the counter tacks to enable the lining to be properly lasted, is eliminated.

Accordingly a feature of the invention consists in an organization including a combined wiper and tacker movable over the shoe bottom and tackers movable relatively to the wiper to position them inside the upper at each side of the wiper and closely adjacent thereto. As herein shown, the flange or counter tackers are positioned initially over the shoe presented to the machine and are moved rearwardly of the shoe prior to movement of the wiper which wipes in and secures the upper between the counter tackers. The movement of the counter tackers may conveniently be effected by spring action which is controlled by movement of a part of the machine, preferably one which moves early in the cycle, for example the mechanism for locking the work support with which machines of this type as previously organized are provided.

Similar results may be secured by an organization also herein shown in which the counter tackers in raised position are moved over the shoe bottom with the wiper and are then moved or swung rearwardly in conjunction with movement toward the shoe bottom.

Another important feature of the invention consists in an organization including means for operating on a shoe bottom, for example wiping and tacking mechanism, and a shoe support movable into and out of operative relation to said means, of means for depressing the shoe to a predetermined position with relation to said operating means, said depressing means acting preferably as an incident to movement of the support to carry the shoe into operative position. In the construction herein shown the work support has an initially raised work receiving position out of operative relation to the operating instrumentalities of the machine, and the depressing means occupies a position between the shoe and the machine with its shoe engaging part above the plane of the shoe bottom. Movement of the work support toward the machine first causes a relative movement of approach between the depressing means and the shoe to cause the depressing means to assume a position over the shoe bottom, and further movement of the shoe support toward the machine causes the depressing means to move with the shoe and relatively thereto to engage the shoe and then to depress the shoe to a predetermined position such that when the shoe reaches the operating instrumentalities the shoe bottom will be in the plane best suited to the effective operation of the said instrumentalities.

A further feature of the invention consists in novel gripper mechanism for seizing the upstanding margin of the upper at the rear end of the shoe. In the construction shown a gripper member is provided which co-operates with the wiper to seize the upper, the gripper member being initially removed vertically from interference or contact with the upper during the introduction of the shoe, which, as explained, is preferably presented in a predetermined vertical position, the gripper being then operated to reach over the upstanding margin of the upper and clamp it against the wiper. The movement of the gripper member, as herein shown, is a wide movement in an arc of a circle the center of which is a short distance above the wiper and substantially in the vertical plane of its gripping face.

Still another feature of the invention consists in means for rigidly sustaining the shoe support, when in its extreme outward or inoperative position. This construction enables the operator, after placing a counter between the upper and lining, to push downwardly on the shoe parts while pressing them against the rear end of the last, thus insuring that any wrinkles will be removed from the lining by rubbing contact with the last. The operator may also, with the last thus firmly supported, more conveniently insert extra tacks or supply tacks which fail to be driven by the machine, should this occur. The arrangement is such that the shoe support is released to permit depression thereof early in its movement toward the machine.

Another feature of the invention consists in novel mechanism for effecting starting of the machine upon movement of the work support, and still further in an organiation comprising means acting upon movement of the shoe toward the machine to locate the shoe for operation of the machine, means actuated as an incident to movement of the shoe for starting the machine, and means for holding and operating upon the shoe.

These and other features of the invention, including various novel constructions and combinations of parts, will appear more fully from the following detailed description when read in connection with the accompanying drawings and will be pointed out in the appended claims.

In the drawings:—

Fig. 1 is a side view, partly in section, of a machine embodying the present invention;

Fig. 1<sup>A</sup> is a sectional detail of the jack locking mechanism shown in Fig. 1;

Fig. 2 is a front view showing the counter tacking mechanism and adajcent parts;

Fig. 3 is a side elevation of mechanism for effecting the starting of the machine by movement of the work support;

Fig. 4 is a plan view of the mechanism shown in Fig. 3;

Fig. 5 is a view of the heel-seat of a shoe upon which the machine has operated;

Fig. 6 is a sectional view taken through the operating instrumentalities of the machine from front to rear;

Fig. 7 is a view similar to Fig. 6, the parts being shown in a different position;

Fig. 8 is a detail, partly in section, of mechanism shown in Fig. 6;

Fig. 9 is a view similar to Fig. 6 showing a modified form of the counter tacking mechanism;

Fig. 10 is a front view of one of the tacking mechanisms employed in the form of the invention shown in Fig. 9;

Fig. 11 is a plan view of parts shown in Fig. 10; and

Fig. 12 is a side elevation of parts shown in Figs. 10 and 11.

In Fig. 1 of the drawings is shown a side elevation, partly in section, of a machine having in general the organization disclosed in the patents above identified to which reference may be had for a detailed description of parts which are not fully explained herein.

The numeral 2 indicates the base or column of the machine to which is pivoted at 4 a work support member or carrier 6. A tubular member or jack post 8 is arranged for vertical sliding movement relatively to the member 6 and is sustained in an initially elevated position by a light spring 10 resting on a plug 12 which is supported on the member 6 and enters loosely the lower end of the tubular member 8. The spring, at its upper end, engages a pin 13 passing through the member 8 so that the member is sustained yieldingly on the spring 10. In the upper portion of the member 8 is a sliding member 14 having at its upper end a heel pin 16 to engage the pin hole of the last. The member 14 is held from turning in the tube and has its vertical movement limited by a screw 17 threaded into it and engaging a slot in the tube 8. Loosely surrounding the upper end of the member 14 and resting on the top of the member 8 is a sleeve 18 which has notches in its upper edge at different heights which are adapted to engage a pin 20 on the member 14. By lifting the member 14 and turning the sleeve 18 the height of the heel pin relatively to the member 8 may be varied to accommodate lasts of widely different heights. The front face of the member 8 is provided with ratchet teeth 22 which are adapted to be engaged by a pawl carried by a rocking member 24 pivoted to the member 6 by trunnions 25 arranged on opposite sides of the member 8. This construction, which is substantially similar to that disclosed in the above-mentioned Ashton patent, will be hereinafter more fully described.

When the work support is in position for reception or removal of the shoe, it is desirable, for reasons above explained, that the work support be supported against depression. For this purpose the member 8 is provided with a roll 26 which, when the support is in its extreme outward position, lies in contact with the raised end of a rigid arm 27 which is fixedly secured at its opposite end to the machine frame. When the support is in the position shown, therefore, the shoe is rigidly supported, and when the shoe support is moved toward the machine the roll 26 lies over a depressed portion of the arm 27 as shown in dotted lines in Fig. 1, and hence depression of the shoe is not interfered with.

Outward swinging movement of the support is limited by a rod 28 pivoted at 29 to the member 6 and passing through an opening in the column 2. On the rod, inside the column, is a spring 30 which is held on the rod by a nut 32 and engages the column yieldingly to limit outward movement of the support.

The mechanism provided for causing the work support to be depressed to a predetermined position as an incident to its movement toward the machine is as follows: A depressor 34 is adjustably secured by a set screw 35 to the upper end of an upright bar 36, the lower end of which is slotted at 38 (Fig. 3) freely to embrace one of the trunnions 25 and therefore partakes of the movement of the member 6 toward the machine. A spring 37 is connected in an inclined position between the lower end of the bar 36 and a pin 39 on the member 6. Since the pull of the spring is in an upwardly and rearwardly inclined direction, one component of the pull tends to lift the bar and the other to swing the bar outwardly about the trunnion 25 as a pivot. A link 40 is held at one end by a pivot 41 to the machine frame, and in the initial position of the support, as shown in Fig. 1, extends downwardly and forwardly, its lower end being loosely pivoted on a stud 42 passing through the bar 36 about midway between its ends and held therein by a set screw 44. The stud 42 is extended and bent inwardly to lie in the path of movement of the tubular member 8 and is preferably provided with a roll 46 to be engaged thereby. By loosening the set screw 44 and turning the stud 42 the amount of movement of the post relatively to the stud 42 may be varied. As the work support is moved inwardly the slotted lower end of the bar 36 moves, of course, with it, causing the bar to swing about the stud 42 as a fulcrum and causing mutual relative approaching movement between the depressor 34 and a shoe on the last pin 16 so that by the time the member 8 engages the roll 46 on the stud 42 the depressor 34 has assumed a position over the shoe bottom, preferably on the heel-seat portion as shown in dotted lines in Fig. 5. Further movement of the member 8 causes the link 40 to move from the inclined position shown in Fig. 1 toward a vertical position and therefore effects a downward movement of the bar 36 and depressor 34, causing it to engage the shoe bottom and depress the shoe against the spring 10 to a predetermined position. This depression of the shoe is such as to bring the shoe vertically into the proper relation to the positioning, gripping, wiping and tacking mechanisms with which the machine is provided and which operate to dispose the upper and counter in proper relation to the last and then to secure them. The depressed position of the shoe may be varied by adjusting the position of the depressor 34 in the bar 36.

A last $a$ having an innersole $b$ secured to its bottom and an upper $c$ arranged loosely over it, is placed on the last pin 16 and a molded counter $d$ inserted between the upper and the lining $e$, the counter being preferably pasted to hold it in permanent relation to the upper. The operator, having adjusted the counter in proper relation to the upper and lining, will hold the upper to the last at its rear end and press downwardly, causing the lining to be rubbed upwardly by contact with the last and wrinkles removed therefrom. The shoe parts having been positioned on the last as shown in Fig. 1, the operator, while holding the upper to the last at the forepart with his hands, swings the shoe with its support toward the machine, nothing further being required of the operator except to move the support. The depressor 34, by the mutual relative movement between it and the support, first assumes a position over the last and is then moved downwardly to depress the shoe to the proper working position relatively to the operating instrumentalities of the machine. As the rear end of the shoe approaches the machine it engages a lower rear end abutment and tacker 50 which is moved rearwardly by the shoe until an upper abutment and tacker 52 engages the shoe. When this occurs the lower abutment is locked against further movement while the upper abutment as well presses yieldingly against the shoe, the abutment locking mechanism being substantially as described in the above mentioned Stewart patent.

The later portion of the movement of the shoe support to bring the shoe into the position above described is utilized to start the power operation of the machine. Between the driving pulley 54 and the main shaft 56 of the machine a clutch is provided which may be of the type disclosed in United States Letters Patent No. 1,026,067 granted May 14, 1912 on application of Orrell Ashton. This clutch is operated to cause power to be transmitited to the shaft 56 by a downward pull on a clutch rod 58 (see Figs. 3 and 4). A block 60 is secured to the rod 58 near its lower end to which is fastened a tension spring 61 which has an upwardly and rearwardly inclined position with its upper end secured to a member 62. Above the block 60 on the rod 58 is a member 64 which is secured to it by a set screw 65. The member 64 is substantially square in transverse section and on its outer and rear faces the member 64 is guided respectively by arms 66, 68 of the member 62. On the member 64 is secured by a bolt 67 a plate 69 which is engaged by a latch 70 secured to the member 62. The member 62 is pivoted on a shaft 72 and has a downwardly projecting arm 74 through which passes loosely a rod 76 connected at 29 to the member 6 of the work support. On the rod 76 is an adjustable collar 78 which is arranged to engage the arm 74 during the final movement of the member 6 toward the machine and to turn the member 62 on the shaft 72, causing the latch 70 to press downwardly on the plate 69 and hence exerting a downward pull on the rod 58 to start the machine.

As soon as the machine starts it is desirable to lock the shoe support in the machine to hold it against the abutments 50, 52, and also to lock it against downward movement beyond the position in which it has been placed by the presser 34. The locking mechanism, which is similar to that disclosed in Patent No. 1,356,510, comprises a hook 80 (Fig. 1) pivoted on the shaft 72 to the column 2 and operated by a compression spring 82 arranged between a bracket 84 secured to the column and an adjustable collar 86 on a rod 88 which is connected to the hook by a pin 89. The rod 88 is connected at its upper end to a bell crank lever 90 (Fig. 6) pivoted at 91 to the machine frame and having a roll 92 which engages a suitable cam 93 on the shaft 56 which, as soon as the machine starts, allows the rod 88 to be raised by the spring 82 and cause the hook 80 to descend behind a roll 94 on the support carrier 6. The roll engaging face of the hook 80 is cammed to cause the member 6 to be drawn toward the machine. Contact of the shoe with the abutments 50, 52 of course opposes further movement of the shoe and hence of the upper end of the post 8 which, at its lower end, is held by the plug 12. The inward pulling action of the hook 80 on the carrier 6 causes the relatively stationary post 8 to apply pressure to the member 24 below its pivot 25, causing the member to tip against a spring plunger 96 and bring a pawl 97 mounted on it into engagement with the teeth 22 to lock the post against depression.

Movement of the hook 80 is utilized to reset the clutch and limit rotation of the shaft 56 to a single revolution. Referring to Fig. 3, a lever 100 is pivoted between its ends on the shaft 72 and connected to the hook by the pin 89. The forward end of the lever 100 is shaped to provide a guide 101 (Fig. 4) for the inner face of the square member 64 and has a cammed bearing face engaging the rear face of the member 64. This face comprises a portion 102 against which the member 64 slides when the clutch is tripped and a portion 104 which acts when the hook 80 drops and the lever 100 is consequently turned on its axis 72 to push forwardly on the member 64 against the rearward component of the pull of the spring 61 sufficiently to free the plate 69 from the latch 70 and allow the upward component of the pull of the spring 61 to lift the clutch rod 58 to normal position. The spring 61 therefore serves the double purpose of lifting the clutch rod and maintaining the member 64 in the recess formed on three of its sides by the guiding surfaces 66, 68 and 101 with the plate 69 in position to be engaged by the latch 70.

After the shoe has been locked in the machine by the descent of the hook 80 the machine operates to drive a tack through the lower abutment 50 to hold the upper while it is being tensioned by a combined wiper and gripper 110, 112 (Figs. 6 and 7). The wiper 110 preferably has the movements provided for it by the construction disclosed in my prior patent above referred to, that is, a movement over the shoe, an upward movement, and then a downward movement against the shoe bottom, the upward movement occurring while the upper is held against the wiper by the gripper 112 which, as herein shown, is of novel construction. The gripper is pivoted at 114 which point is slightly above and substantially in the vertical plane of the co-operating face of the wiper 110. From the pivot 114 the gripper 112 extends in an upward, outward and downward direction so that when open, as shown in Fig. 6, its end is well above the plane of the shoe bottom so as not to interfere with movement of the upwardly extending margin of the upper into proper position between it and the wiper 110. Preferably the gripper terminates in a blunt point and the co-operating face of the wiper is notched to receive the pointed end of the gripper. Movement of the gripper consists in a swinging movement about the pivot 114 through a wide angle which movement causes the end of the gripper to reach down behind the upstanding margin of the upper and force it against the co-operating face of the wiper securely to hold it during the upward and overwiping movements of the wiper. The gripper 112 is operated by links 116 connected to the gripper near its gripping end and connected to a lever 118 pivoted at 120 and operated by engagement therewith of a screw 122 on the angle lever 124 pivoted at 125 (Fig. 2) which is moved by a spring 126 (Fig. 8) when permitted to do so by a cam 128 (Fig. 6), the construction, in most respects, being similar to that described in the above-mentioned Stewart patent. Soon after the wiper begins to move, the gripper is swung about its pivot 114 through a wide arc of short radius from the position shown in Fig. 6, where it does not interfere with the upper as the shoe is presented to the machine, to a position as shown in Fig. 7 where it tightly holds the margin of the upper against the wiper 110. After the upper is gripped the wiper and gripper rise and tension the upper and then are lowered to wipe the upper upon the shoe bottom. The gripper releases the upper after control of the upper has been assumed by the wiper. When the wiper 110 has completed its movement over the shoe bottom the central heel-seat tack is driven by a driver 130 on a driver bar 132 mounted for vertical movement in a wiper carrying slide 134 and operated by a driver lever 136 (Fig. 1) also mounted on the slide 134 and controlled by a cam 138 on the shaft 56. At this time also, if desired, a tack may be driven through the upper abutment 52 into the rear end of the last in the usual manner.

It will be noted that the central tacker has a movement bodily from a position at the rear of the shoe forwardly to a position over the shoe bottom. As shown in Fig. 7, the counter tackers are moved rearwardly to positions over the counter flange at each side of the path of the wiper and central heel-seat tacker. Movement to this position takes place prior to movement of the wiper and is controlled by the locking hook 80. The counter tackers comprise tacker frames 140, 142, best shown in Fig. 2, in which are guided driver bars 144, 146. The driver bars have universal joint connection with a head 148 which is connected to the driver lever 136. The driver bars and upper ends of the tacker frames partake, therefore, of the movement of the wiper carrier 134. On the rear faces of the tacker frames 140, 142 are blocks 150, 152 which have downwardly open slots adapted to embrace pins 154, 156 (Fig. 8). The blocks 150, 152 have stems 158, 160 which engage holes in the tacker frame and are adjustably held therein by set screws 161. Springs 162 are connected to pins 163 projecting forwardly from the tacker frames and are arranged to pull downwardly and rearwardly on the frames to move the tackers downwardly and rearwardly, to maintain the frames upon the pins 154, 156, and to cause them to press outwardly against adjustable collars 164 on the pins by which the extent of separation of the tackers is adjusted and maintained. The pins 154, 156 are connected respectively to arms 166, 168 on rock shafts 170, 172 journaled in brackets 174, 176 on the frame. The rock shafts 170, 172 have at their outer ends arms 173, 175, in which are swiveled studs 177, 179 through which rods 182, 184 pass freely. On the rods below the studs 177, 179 are collars 178, 180 held by set screws. The rods 182, 184 extend downwardly and are connected (Fig. 1) to an angle lever 186 which is raised by the hook 80 and acts through the rods 182, 184 to lift the arms 173, 175, turn the rock shafts 170, 172, and cause the pins 154, 156 to raise and move forwardly of the shoe the counter tacker frames against the springs 162 to the position shown in Fig. 8. Conversely, when the hook descends the counter tackers are moved rearwardly and downwardly by the springs 162 from the position shown in Figs. 6 and 8 to the position shown in Fig. 7. The angle lever 186 is connected through suitable mechanism, described in my prior patent, to the side pressers 188, 190 which are operated by springs 192, 194 to close upon the sides of the rear portion of the shoe when the hook 80 descends to lock the shoe in the machine. After the counter tackers have been caused to assume the position shown in Fig. 7 by the descent of the hook 80, the wiper carrier begins to move over the shoe bottom carrying with it, of course, the upper ends of the driver bars 144, 146 and tacker frames 140, 142, the lower ends of the tacker frames remaining nearly stationary because of their engagement with the pins 154, 156. These pins are so near the tack nozzles 196 of the tacker frames that only slight additional rearward movement of the tack nozzles is effected by movement of the wiper but the tacker frames are straightened up to a position substantially perpendicular to the shoe bottom. Movement of the wiper 110 next occurs as has been previously described, the upper being wiped in between the tack nozzles 196 and the central heel-seat tack driven by the driver bar 132, while at the same time tacks are driven by the counter tack driver bars 144, 146, the tacks, of course, being driven through the counter flange and not through the upper, in close proximity to the central heel-seat tack. Preferably, the depressor 34 is pronged as indicated in Fig. 5 so as to allow the wiper 110, in its forward movement, to pass between the prongs.

In Figs. 9, 10, 11 and 12 is shown a modified form of means for operating the counter tackers. In this construction, as in the Stewart patent referred to above, the counter tackers are initially positioned at the rear of the shoe and are moved over the shoe bottom with the wiper 110. A rod 200 extends transversely through the wiper carrier 134, and on the rod at each side of the machine is slidingly arranged a bracket 202 to which a bifurcated member 204 is pivoted by a stud 206 held in the bracket by a set screw 208. The counter tacker frame 210 at each side is inserted between the bifurcations of the member 204 and is held therein by a bolt 212 engaging an inclined slot 214 in the tacker frame. The slot 214 permits vertical movement of the tacker frames 210 and its inclination causes them to separate slightly when they are moved down. The tackers are held elevated and toward each other by springs 216, one of which is shown in Fig. 10, and are moved down by mechanism connected with the gripper operating lever 124. On the lever 124 (Fig. 9) is a headed stud 218 the head of which, when the lever moves outwardly to release the gripper, engages a projection 220 on a rocker 222 pivoted at 224 and having two arms 226 each of which engages a ledge 228 on each tacker frame. The ledges are best shown in Fig. 2. Outward movement of the gripper operating lever 124 positively by its cam 128 causes the head of the stud 218 to engage the projection 220 and turn the rocker 222 clockwise (Fig. 9), the arms 226 depressing both tacker frames after they have been brought forward over the shoe bottom with the wiper. During their depression each tacker frame is swung on its stud 206 to move its tack nozzle 196 rearwardly of the shoe. This is effected by a cam plate 230 secured at 232 to each tacker frame 210 (Fig. 10) and co-operating with an adjustable member 234 pivoted on the upper end of the stud 206 and held in position by a cap screw 236 passing through a slot 238 in the member and threaded into the bracket 202. As the tacker frames are depressed an inclined face 240 (Fig. 12) on the plate 230 engages a corresponding face on the member 234 and swings the tacker frame rearwardly of the shoe about the pivot 206 of its bifurcated supporting member 204. When the tacker frames are released by reverse movement of the arms 226, they are raised and, if separated, moved together by the springs 216 and are restored to initial forward position by springs 242 (Fig. 11) arranged between the brackets 202 and the bifurcated members 204. The prior construction by which the tacker frames are separated during their movement over the shoe may be retained if desired. This construction comprises rolls 246 (Fig. 10) secured to the brackets 202 and arranged to engage cams 248 on the side pressers 188, 190 which engage and caliper the shoe as disclosed in the Stewart patent above identified. The cams act on the rolls to separate the tackers, the rolls being adjustable laterally of the shoe. By setting the rolls 246 outwardly, any portion or all of the separating movement may be dispensed with and the counter tacks located in as close proximity to the central heel-seat tack as is desired.

Having thus described my invention, what I claim as new and desire to secure by Letters Patent of the United States is:—

1. In a machine of the class described, a wiper movable over a shoe bottom, tackers movable rearwardly of the shoe, means for moving the tackers while the wiper remains at rest, means for then moving the wiper, and means for thereafter operating the tackers to insert tacks.

2. In a machine for operating on the heel end of a shoe, a wiper movable over the shoe bottom, tackers arranged for movement toward the wiper, means for moving the tackers to position them over the counter flange inside the upper, and means for then moving the wiper to wipe down the upper between the tackers.

3. In a machine for operating on the heel end of a shoe, a wiper movable over a shoe bottom, tackers mounted one at each side of the path of the wiper for movement toward the rear of the shoe, means for moving the tackers rearwardly to position them over the flange of the counter, and means for moving the wiper to wipe the upper over the flange between the tackers.

4. In a machine for assembling parts of boots and shoes upon their lasts preparatory to lasting, the combination of a combined wiper and tacker movable over the shoe bottom to wipe in and secure a portion of the upper to the shoe bottom, and tackers arranged to be located inside the upper over the counter flange and closely adjacent to the wiper at each side thereof so as to insert tacks substantially in line with the tack driven through the upper.

5. In a machine of the class described, a wiper movable over a shoe bottom, tackers movable over the shoe bottom, means for moving the tackers to locate them over the counter at the rear end of the shoe, means for advancing the wiper to wipe the upper down on the shoe bottom between the tackers' and means for inserting a tack through the upper substantially in line with the counter tacks.

6. In a machine of the class described, a wiper movable over a shoe bottom, tackers arranged for movement toward the wiper, means for first moving the tackers to position them over the counter flange inside the upper at the rear end of the shoe and rearwardly of the corners of the heel-seat, and means for then moving the wiper to wipe down the upper between the tackers.

7. In a machine of the class described, a wiper movable over a shoe bottom, tackers mounted one at each side of the path of the wiper for movement toward the rear of the shoe, means operating early in the cycle for moving the tackers to position them over the flange of the counter, means operating later in the cycle for moving the wiper to wipe the upper over the flange between the tackers, and means for securing the wiped over portion of the upper.

8. In a machine for assembling parts of boots and shoes upon their lasts preparatory to lasting, the combination of a combined wiper and tacker movable over the shoe bottom to wipe in and secure a portion of the upper to the shoe bottom, and tackers arranged for downward and rearward movement to locate them inside the upper over the counter flange closely adjacent to the wiper at each side thereof and in substantial lateral alinement therewith.

9. In a machine for assembling parts of boots and shoes upon their lasts preparatory to lasting, the combination of a combined wiper and tacker movable over the shoe bottom to wipe in and secure a portion of the upper to the shoe bottom, and tackers arranged for movement in a direction opposite to the movement of the wiper to position them inside the upper over the counter flange and closely adjacent to the wiper at each side thereof.

10. In a machine for assembling parts of boots and shoes upon their lasts preparatory to lasting, the combination of tackers arranged for movement rearwardly over the shoe to a position over the counter flange at the rear end of the shoe, a wiper arranged for movement forwardly of the shoe between the tackers to wipe in the margin of the upper, and means for securing the upper.

11. In a machine for assembling parts of boots and shoes upon their lasts preparatory to lasting, the combination of a combined wiper and tacker, counter tackers, a shoe support, means for locking the shoe support with the shoe in operative relation to the wiper and tacker, means operated by said locking means to locate the counter tackers over the counter flange inside the margin of the upper, and means for then operating the wiper and tacker to wipe over the margin between the counter tackers.

12. In a machine for assembling parts of boots and shoes upon their lasts preparatory to lasting, the combination of a combined wiper and tacker movable over the shoe bottom to wipe in and secure a portion of the upper to the shoe bottom, counter tackers arranged for movement in a direction opposite to the movement of the wiper to position them inside the upper over the counter flange and closely adjacent to the wiper at each side thereof, and means for effecting movements of the counter tackers and wiper successively.

13. In a machine for assembling parts of boots and shoes upon their lasts preparatory to lasting, the combination of tackers arranged for movement rearwardly over the shoe to a position over the counter flange at the rear end of the shoe and rearwardly of the corners of the heel-seat, a wiper arranged for movement forwardly of the shoe between the tackers to wipe in the margin of the upper, means for moving the tackers prior to movement of the wiper, and means for securing the upper.

14. In a machine for assembling parts of boots and shoes upon their lasts preparatory to lasting, the combination of a combined wiper and tacker, counter tackers, a shoe support, means acting when the machine starts to lock the shoe support with the shoe in operative relation to the wiper and tacker, means controlled by said locking means to locate the counter tackers over the counter flange inside the margin of the upper, and means for operating the wiper and tacker to wipe over the margin between the counter tackers.

15. In a machine for assembling parts of boots and shoes upon their lasts preparatory to lasting, the combination of a combined wiper and tacker movable over the shoe bottom to wipe in and secure a portion of the upper to the shoe bottom, and counter tackers arranged for movement at first with the wiper over the shoe bottom and then in a direction opposite to the movement of the wiper to position them inside the upper over the counter flange.

16. In a machine for assembling parts of boots and shoes upon their lasts preparatory to lasting, the combination of counter tackers arranged for movement forwardly over the shoe and then rearwardly to a position over the counter flange at the rear end of the shoe, a wiper arranged for movement forwardly of the shoe to wipe in the margin of the upper, and means for securing the upper.

17. In a machine for assembling parts of boots and shoes upon their lasts preparatory to lasting, the combination of a combined wiper and tacker, counter tackers, a shoe support, means for locking the shoe support with the shoe in operative relation to the wiper and tacker, means becoming effective coincidently with the operation of said locking means to locate the counter tackers over the counter flange inside the margin of the upper, and means for then operating the wiper and tacker to wipe over the margin of the upper.

18. In a machine of the class described, the combination of means for working an upper over a shoe bottom, a shoe support movable toward and from the machine and movable vertically, a shoe engaging member arranged for movement with the support, and means acting as an incident to said movement to cause the shoe engaging member to move the shoe and support vertically.

19. In a machine of the class described, the combination of a movable shoe support, a positioning member movable horizontally with the support, and means acting as an incident to said movement to cause the positioning member to move the support vertically.

20. In a machine of the class described, the combination of a shoe support movable vertically and toward the machine, a movably supported depressor arranged to engage the shoe, and means operated by movement of the support toward the machine to lower the depressor and cause it to locate the shoe in predetermined vertical position.

21. In a machine of the class described, the combination of a shoe support movable toward and from the machine and vertically, a depressor movable in the same directions as the support, said depressor being normally above a shoe on the support, and means operating when the support and depressor are moved together to cause the depressor to engage and depress the shoe.

22. In a machine of the class described, the combination of mechanism for operating upon a shoe which requires the shoe to be located in predetermined vertical position, a shoe support movable toward and from said mechanism and movable vertically, a shoe engaging member arranged to partake of the movement of the support toward and from said mechanism, and means acting as an incident to said movement to cause the shoe engaging member to move the shoe and support to said predetermined vertical position.

23. In a machine of the class described, the combination of mechanism for operating on a shoe bottom which mechanism requires the shoe bottom to be located vertically in a predetermined plane, a support movable to and from the machine and vertically, a positioning member movable to and fro with the support, and operating connections acting during said to and fro movement to cause the positioning member to engage the shoe bottom and move the support vertically to locate the shoe bottom in said predetermined plane.

24. In a machine of the class described, the combination of mechanism for operating upon a shoe bottom presented thereto in a predetermined position vertically, a depressible shoe support movable toward and from the machine, and means acting during the movement of the support toward the machine to depress the support and locate the shoe bottom irrespectively of the height of the last in said predetermined vertical position with respect to said operating mechanism.

25. In a machine of the class described, means for operating on a shoe bottom, a shoe support movable to enable the shoe to be located in proper relation to the operating means, means operating automatically to locate the shoe in proper relation to the operating means, and means acting automatically after the shoe is located to start the machine.

26. In a machine of the class described, means for working a shoe upper over the bottom of the last, a shoe support movable toward and from the overworking means, a last depressor, and operating connections between the depressor and shoe support to cause the depressor to locate the shoe in predetermined position prior to its arrival in operative relation to the overworking means.

27. In a machine of the class described, means for working a shoe upper over the bottom of the last, a shoe support movable toward and from the overworking means, a last depressor, operating connections between the depressor and shoe support to cause the depressor to locate the shoe in predetermined position prior to its arrival in operative relation to the overworking means, and operating connections between the support and the machine to cause the machine to start after the shoe has been located.

28. In a machine of the class described, the combination of mechanism for operating on a shoe bottom presented thereto in a predetermined vertical position, a movable support, a movable support depressor arranged to engage a shoe on the support during movement of the shoe toward the machine, and means operated by movement of the support toward the machine to cause the depressor to depress the shoe to a predetermined extent.

29. In a machine of the class described, the combination of mechanism for operating on a shoe bottom presented in a predetermined vertical position, a shoe support movable toward and from the said mechanism, a depressor movable in the same direction as the support, said depressor being normally above the shoe on the support, and means operated when the support and depressor are moved together in the same direction to cause the depressor to engage and depress the shoe into predetermined operative relation to said mechanism.

30. In a machine of the class described, the combination of a shoe support movable toward and from the machine, a depressor movable in the same direction as the support, said depressor being normally above the shoe on the support, operating connections for causing mutual movement of approach between the shoe support and depressor until the depressor is over the shoe bottom and for then causing the depressor to move with the shoe and to move vertically to engage and depress the shoe.

31. In a machine of the class described, means for working a shoe upper over a last, a shoe support movable toward and from the overworking means and vertically, and operating connections between the support and the machine for effecting, upon movement of the support toward the machine, vertical movement of the support directly as the height of the last to locate the shoe for operation of the overworking means.

32. In a machine of the class described, a wiper movable over the shoe bottom, a gripper arranged to co-operate with the front face of the wiper, a last support constructed and arranged to present, irrespectively of the height of the last, a shoe to the wiper with its bottom in a predetermined horizontal plane appropriate for the action of the wiper and with the margin of the upper extending above the shoe bottom, the gripper being initially above said margin, and means for moving the gripper to cause it to clamp the margin of the upper against the front face of the wiper.

33. In a machine of the class described, means for working a shoe upper over a last, a shoe support movable toward and from the overworking means and movable vertically to enable lasts of varying heights to be located in proper relation to the overworking means, and means carried by the support operating automatically during movement of the shoe toward the machine to locate the shoe bottom irrespectively of the height of the last in proper relation to the overworking means.

34. In a machine of the class described, means for working a shoe upper over a last, a shoe support movable toward and from the overworking means, a last depressor arranged between the machine and the shoe when the shoe is in its outer position, and means operating as an incident to movement of the shoe support to cause the shoe to overtake the depressor and cause the depressor to depress the shoe prior to its arrival in operative relation to the overworking means.

35. In a machine of the class described, means for operating on a shoe, a shoe support movable toward and from the operating means, a last depressor arranged between the machine and the shoe when the shoe is in its outer position, means for effecting a mutual movement of approach between the last and depressor and then movement of the two together toward the machine, and means for effecting depression of the depressor during their movement together.

36. In a machine of the class described, means for working a shoe upper over a last, a shoe support movable toward and from the overworking means and movable vertically to enable lasts of varying heights to be located in proper relation to the overworking means, and means engaging the shoe bottom and operative automatically during movement of the shoe toward the machine to locate the shoe bottom irrespectively of the height of the last in proper relation to the overworking means.

37. In a machine of the class described, means for working a shoe upper over a last, a shoe support movable toward and from the overworking means, a last depressor arranged between the machine and the shoe when the shoe is in its outer position, and means operating as an incident to movement of the shoe support to cause mutual approach between the shoe and depressor until the depressor is over the shoe and then operating the depressor to depress the shoe prior to its arrival in operative relation to the overworking means.

38. In a machine of the class described, means for working a shoe upper over a last, a shoe support movable toward and from the overworking means, a last depressor arranged between the machine and the shoe when the shoe is in its outer position, means for effecting a mutual movement of approach between the last and depressor and then movement of the two together toward the machine, and means for effecting a predetermined downward movement of the depressor during their movement together.

39. In a machine of the class described, means for operating on a shoe bottom, a shoe support movable to enable the shoe to be located in proper relation to the operating means, means operating automatically to locate the shoe in proper relation to the operating means, means acting automatically after the shoe is located to start the machine, and mechanism acting after the machine starts to hold the support against movement during the action of the operating means.

40. In a machine of the class described, means for working a shoe upper over the bottom of the last, a shoe support movable toward and from the overworking means, a last depressor, operating connections between the depressor and shoe support to cause the depressor to locate the shoe in predetermined position prior to its arrival in operative relation to the overworking means, connections between the support and machine to start the machine, and means acting automatically when the machine starts to maintain the support in said position during operation of the overworking means.

41. In a machine of the class described, means for working a shoe upper over the bottom of the last, a shoe support movable toward and from the overworking means, a last depressor, operating connections between the depressor and shoe support to cause the depressor to locate the shoe in predetermined position prior to its arrival in operative relation to the overworking means, operating connections between the support and the machine to cause the machine to start after the shoe has been located, and locking means acting automatically after the machine starts to hold the support in said predetermined position during operation of the overworking means.

42. In a machine of the class described, the combination of mechanism for operating on a shoe bottom presented thereto in a predetermined vertical position, said mechanism being constructed and arranged to perform its cycle and stop, a movable support, a movable support depressor arranged to engage a shoe on the support during movement of the shoe toward the machine, means operated by movement of the support toward the machine to cause the depressor to depress the shoe to a predetermined extent, means operating automatically when the shoe is positioned in the machine to start the mechanism, automatic means for locking the support against movement in response to the action of said mechanism, and automatic means to unlock the support before the machine stops.

43. In a machine of the class described, means for working a shoe upper over a last, a shoe support movable toward and from the overworking means and vertically, operating connections between the support and the machine for effecting, upon movement of the support toward the machine, vertical movement of the support which varies directly as the height of the last to locate the shoe for operation of the overworking means, and means for holding the support against depression during operation of the overworking means.

44. In a machine of the class described, a wiper movable over the shoe bottom, a gripper arranged to co-operate with the front face of the wiper, a last support, means operated by movement of the support toward the machine for effecting heightwise movement of the shoe to present it to the wiper with its bottom substantially in the plane of action of the wiper and with the margin of the upper extending above the shoe bottom, the gripper being initially above said margin, means for moving the gripper downwardly and rearwardly to cause it to clamp the margin of the upper against the front face of the wiper, and means for actuating the wiper and gripper together over the shoe bottom.

45. In a machine of the class described, a wiper movable over a shoe bottom and a gripper arranged to co-operate with the front face of the wiper, said gripper being pivoted in the vertical plane of said face a short distance above the wiper, and means for moving the gripper through a wide arc to cause it to reach over the upstanding margin of upper and clamp it against the front face of the wiper.

46. In a machine of the class described, a wiper movable over a shoe bottom, a gripper arranged to co-operate with the wiper to seize the upstanding margin of an upper, the gripper being constructed and arranged to move through a wide arc of short radius so as to reach over the upstanding margin of the upper, and means for operating the gripper to seize the upper prior to movement of the wiper over the shoe bottom.

47. In a machine of the class described, a wiper movable over a shoe bottom and a forwardly, downwardly and rearwardly curved gripper arranged to co-operate with the front face of the wiper and pivoted a short distance above the wiper, and means for moving the gripper through a wide arc to cause it to reach over the upstanding margin of upper and clamp it against the front face of the wiper.

48. In a machine of the class described, a wiper movable over a shoe bottom, a gripper pivoted to the wiper and arranged to co-operate with the wiper to seize the upstanding margin of an upper, the gripper being constructed and arranged for movement so as to reach over the upstanding margin of the upper, means for operating the gripper to seize the upper, and means for effecting movement of the gripper and wiper over the shoe bottom.

49. In a machine of the class described, means for operating upon a shoe, a depressible last support movable toward and from the machine, and means operative when the support is in its position away from the machine to sustain the support against depression so that the support may be employed as a rigid rest for the last and to release the support for depression early in its movement toward the machine.

50. In a machine of the class described, operating means requiring presentation of a shoe thereto with its bottom in a predetermined vertical position, a shoe support arranged for depression and movable toward and from the machine, means for holding the shoe support against depression operative only when the support is in shoe receiving position, and means for depressing the shoe and support to said predetermined vertical position as an incident to movement of the support toward the operating means.

51. In a machine for working the upstanding margin of an upper over the bottom of an insole upon a last, a wiper carrier, a wiper having a front face to which the margin of the upper is opposed when the shoe is presented in operative relation to the wiper, means for moving the wiper over the shoe bottom, a gripper pivoted to the wiper carrier and having its gripping face normally above the front face of the wiper, and means for operating the gripper, the pivot of the gripper being so located as to cause the gripping face of the gripper to descend and hold the margin of the upper against the front face of the wiper during movement of the wiper to wipe the upper over the shoe bottom.

52. In a machine for working an upper over a last, a wiper movable inwardly of the last over the last bottom, and a gripper pivoted to the wiper for movement therewith constructed and arranged to have a component of vertical movement to cause it to reach over the upper and smooth the upper against the wiper prior to movement of the wiper over the last bottom.

53. In a machine of the class described, a cam shaft, a clutch for causing power actuation of the shaft, a work support movable toward the machine, connections from the work support for tripping the clutch when the work support has reached working position, locking mechanism for holding the support in such position during operation of the machine, and means operated by said locking mechanism for resetting the clutch to stop the machine at the end of its cycle.

54. In a machine of the class described, a cam shaft, a clutch for causing power actuation of the shaft, a work support movable toward the machine, connections from the work support for tripping the clutch when the work support has reached working position, a locking hook operating when the machine starts to lock the support to the machine, and means operated by the hook for releasing said connection to permit the machine to stop when its cycle is completed.

In testimony whereof I have signed my name to this specification.

NORWOOD H. KNOWLTON.